United States Patent
Beekmann et al.

(10) Patent No.: US 11,855,547 B2
(45) Date of Patent: Dec. 26, 2023

(54) WIND POWER PLANT FOR FEEDING ELECTRICAL POWER BY MEANS OF FULL CONVERTERS

(71) Applicant: Wobben Properties GmbH, Aurich (DE)

(72) Inventors: Alfred Beekmann, Wiesmoor (DE); Ingo Mackensen, Aurich (DE); Kai Busker, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/768,580

(22) PCT Filed: Jan. 3, 2019

(86) PCT No.: PCT/EP2019/050078
§ 371 (c)(1),
(2) Date: May 29, 2020

(87) PCT Pub. No.: WO2019/134928
PCT Pub. Date: Jul. 11, 2019

(65) Prior Publication Data
US 2021/0175718 A1     Jun. 10, 2021

(30) Foreign Application Priority Data
Jan. 3, 2018 (DE) .................... 10 2018 100 084.7

(51) Int. Cl.
*H02J 3/38* (2006.01)
*H02P 9/10* (2006.01)
(Continued)

(52) U.S. Cl.
CPC .......... *H02M 5/458* (2013.01); *F03D 7/0284* (2013.01); *F03D 7/048* (2013.01); *H02J 3/381* (2013.01);
(Continued)

(58) Field of Classification Search
CPC ........ F03D 7/0284; F03D 7/048; H02P 9/105; H02P 9/305; H02P 2101/15;
(Continued)

(56) References Cited

U.S. PATENT DOCUMENTS

| 6,437,996 B1 | 8/2002 | Wobben | |
| 2015/0148974 A1* | 5/2015 | Diedrichs | ................. H02J 3/50 700/287 |

(Continued)

FOREIGN PATENT DOCUMENTS

| CN | 202444429 U | 9/2012 |
| DE | 19845903 A1 | 4/2000 |

(Continued)

OTHER PUBLICATIONS

Song, et al., "Implementation and Control of Grid Connected AC-DC-AC Power Converter for Variable Speed Wind Energy Conversion System," *Eighteenth Annual IEEE Applied Power Electronics Conference and Exposition. APEC '03*, 2003, pp. 154-158.

(Continued)

*Primary Examiner* — Joseph Ortega
(74) *Attorney, Agent, or Firm* — SEED INTELLECTUAL PROPERTY LAW GROUP LLP (57) ABSTRACT

The invention relates to a method for feeding electrical power into an electrical supply grid. The method includes rectifying a first AC voltage of an electrical power, produced by a generator, into a first DC voltage and increasing the first DC voltage to a second DC voltage such that the second DC voltage has a step-up ratio in relation to the first DC voltage. Alternatively, the method includes rectifying the first AC voltage into the second DC voltage without producing the first DC voltage. The method includes inverting the second DC voltage into a second AC voltage for feeding electrical power into the electrical supply grid depending on an feed (Continued)

setpoint value and setting the second DC voltage depending on the feed setpoint value and actual value. The second DC voltage is increased depending on an increase in the feed setpoint voltage or actual value.

15 Claims, 4 Drawing Sheets

(51) Int. Cl.

| | | |
|---|---|---|
| *H02P 9/30* | (2006.01) | |
| *F03D 7/02* | (2006.01) | |
| *F03D 7/04* | (2006.01) | |
| *H02M 5/458* | (2006.01) | |
| *H02J 3/50* | (2006.01) | |
| *H02P 101/15* | (2016.01) | |

(52) U.S. Cl.
CPC ............... *H02J 3/50* (2013.01); *H02P 9/105* (2013.01); *H02P 9/305* (2013.01); F05B 2270/337 (2013.01); H02J 2300/28 (2020.01); H02P 2101/15 (2015.01)

(58) Field of Classification Search
CPC .... H02P 2103/20; H02P 9/02; H02J 2300/28; H02J 3/386; F05B 2270/337; Y02E 10/76; Y02E 10/72; H02M 5/458; H02M 3/155; H02M 3/335
See application file for complete search history.

(56) References Cited

U.S. PATENT DOCUMENTS

| | | | |
|---|---|---|---|
| 2015/0226185 A1* | 8/2015 | Beekmann | ............... H02J 3/38 290/44 |
| 2016/0111883 A1 | 4/2016 | Beekmann | |
| 2017/0284370 A1 | 10/2017 | Gensior | |

FOREIGN PATENT DOCUMENTS

| | | | | |
|---|---|---|---|---|
| DE | 102013208410 A1 | 11/2014 | | |
| DE | 102014219052 A1 | 3/2016 | | |
| EP | 2429073 A2 * | 3/2012 | ............... | H02J 3/38 |
| EP | 2429073 A2 | 3/2012 | | |
| ES | 2190735 A1 | 8/2003 | | |

OTHER PUBLICATIONS

Garcia-Hernandez et al., "Modeling and Control of a Wind Turbine Synchronous Generator," *2011 Electronics, Robotics and Automotive Mechanics Conference*, pp. 222-227, IEEE Computer Society, 2011. (6 pages).

Margaris et al., "Direct Drive Synchronous Generator Wind Turbine Models for Power System Studies," *7th Mediterranean Conference and Exhibition on Power Generation, Transmission, Distribution and Energy Conversion*, Nov. 7-10, 2010, Agia Napa, Cyprus, Paper No. MED10/102. (7 pages).

* cited by examiner

Fig. 4

WIND POWER PLANT FOR FEEDING ELECTRICAL POWER BY MEANS OF FULL CONVERTERS

BACKGROUND

Technical Field

The present invention relates to a method for feeding electrical power into an electrical supply grid, in particular by means of a wind power plant. The invention also relates to a corresponding wind power plant.

Description of the Related Art

Modern wind power plants conventionally use a so-called full converter concept for feeding electrical power into an electrical supply grid. In this case, an electrical AC voltage is generated by a generator and rectified into a first DC voltage. This first DC voltage can be stepped up to a second DC voltage by means of a step-up converter. Alternatively, the AC voltage can also be rectified directly into the desired second DC voltage by way of an active rectifier, the first DC voltage is then omitted. In both cases, the second DC voltage forms an input for an inverter which generates the electrical power which is to be fed into the electrical supply grid with an AC voltage which is adjusted to the electrical supply grid.

The second DC voltage is thus correspondingly high enough to be able to generate an AC voltage of such a level that the generated power can be fed into the electrical supply grid. In other words, this second DC voltage must be high enough so that the level of the AC voltage required for feeding in can also be reached. This level of the AC voltage which is to be fed in thus corresponds to the level of the AC voltage in the electrical supply grid, where applicable taking into account a transmission ratio of a transformer if this AC voltage is fed into the electrical supply grid via a transformer of this type.

The step-up converter or active rectifier controls the generator in particular by controlling the first AC voltage of the electrical power generated by the generator. This can take place indirectly by setting the level of the first DC voltage, or directly by way of the active rectifier.

If the generator power is low, i.e., in particular in comparatively low winds, the step-up converter or the active rectifier should in particular ensure that the second DC voltage is also achieved. The step-up converter or the active rectifier indeed substantially control the generator, in particular emitting a stator current of the generator, however they must guarantee that the second DC voltage is achieved. In strong winds, the generator regularly yields so much power that the second DC voltage can be easily achieved. In particular, it is possible here that the step-up converter is not needed at all in strong winds and in the case of correspondingly high generator power. In particular in full load operation, i.e., if the wind speed has reached or is above a nominal wind speed, control of the wind power plant substantially operates in such a way that it must limit generator power. Optimal control of the generator in the case of which a particularly high stator current can flow is then no longer necessary.

The step-up converter or active rectifier thus substantially controls the generator.

However, nowadays it is also important to also perform supporting functions for the electrical supply grid when feeding in, in addition to feeding in the generated active power. Correspondingly, for supporting functions of this type, feeding in active power and reactive power can in particular be altered for support. In particular, a reactive power feed-in which depends on the line voltage is possible, which can in particular counteract a drop in the voltage of the electrical supply grid by way of a reactive power feed-in. Moreover, in particular an active power feed-in which depends on the line frequency of the electrical supply grid is also possible, in the case of which in particular a frequency which is too high can be counteracted by reducing the active power feed-in.

However, in particular in low winds, the possibilities for the wind power plant to feed in active power and reactive power for the purpose of grid support are correspondingly limited. However, in low winds in particular, it can be beneficial if wind power plants can contribute to grid support, since wind power plants which fundamentally have good and fast control characteristics are less dominant in low winds and can therefore give rise to a grid which is weakened in terms of stability.

In the priority application for the present application, the German Patent and Trademark Office researched the following prior art: DE 10 2013 208 410 A1, DE 10 2014 219 052 A1 and CN 202 444 429 U.

BRIEF SUMMARY

Achieving better grid support over a greatest possible area is described herein. A method is proposed. Accordingly, a first AC voltage of an electrical power generated by a generator is rectified with a first electrical DC voltage. This DC voltage is then stepped up to a second DC voltage. A step-up converter can be used for this purpose. In particular, the step-up takes place in such a way that the second DC voltage has a step-up ratio relative to the first DC voltage. This step-up ratio can thus characterize the ratio between these two DC voltages.

Alternatively, the first AC voltage can also be rectified directly into the second DC voltage without the first DC voltage being generated as an intermediate variable. A direct rectification of this type to the second DC voltage is in particular carried out with an active rectifier which can rectify not only an AC voltage and a DC voltage but can also control currents in a selective manner.

As a result, both variants, i.e., on the one hand, rectifying and stepping up and, on the other hand, rectifying directly without stepping up, can bring the first AC voltage of the generator into the second DC voltage. The first AC voltage is preferably an output voltage at stator terminals, i.e., at the output of a stator, of a synchronous generator.

This second DC voltage then forms the input voltage or the basis for an inverter which inverts this second DC voltage into a second AC voltage, in order to then feed the electrical power, which has been substantially generated by the generator, into the electrical supply grid. In this case, the electrical power is fed in depending on a feed set point value. This means that it is not the case that as much power as is available is fed in in an uncontrolled manner, but instead a set point value is specified for this purpose, in order to be able to thus also achieve grid support. However, if grid support is not required or does not require anything else, the power which is available in each case and which can be extracted from the wind can also be specified as the feed set point value as the active power set point value.

However, the feed set point value preferably specifies a value for an active power component and a reactive power component. This can also mean that the feed set point value specifies a current to be fed in according to amount and phase, in particular when assuming a line voltage. In this case, the phase describes a phase angle of the current to be fed in with regard to the phase angle of the voltage in the electrical supply grid.

It is now proposed that the second DC voltage is set depending on the feed set point value. This means that the second DC voltage is not simply left at a firmly predetermined value, but instead is varied as required. This depends on the feed set point value. In addition, it is proposed that the second DC voltage is increased depending on an increase in the feed set point value. It is therefore proposed that the second DC voltage is increased if the feed set point value increases. If the feed set point value includes an active power component and a reactive power component, the value of the apparent power can be used as the reference value. This means that if the apparent power of this feed set point value increases, it is proposed that the second DC voltage is also increased. Correspondingly, the second DC voltage can also be increased if a set point value for the current to be fed in is increased, namely based on the amount of current to be fed in. If the feed-in voltage is equivalent, i.e., if the second AC voltage is equivalent, this corresponds to a consideration of the apparent power, at least in principle.

However, it is also possible to use the actual value of the feed instead of the feed set point value. By using the feed set point value, it is possible to have particularly good anticipatory control. By using the actual value of the feed, the relevant value is well known, since the feed set point value could deviate from the actual value of the feed which is actually fed in. When considering the actual value of the feed, the voltage adjustment may therefore only react some time later. Unless described otherwise, the following explanations and effects of the consideration of the feed set point value can also be applied to a consideration of the actual value of the feed. A combination is preferably also possible, in particular in a manner in which the feed set point value and the actual value of the feed are incorporated via weighting. Dynamic weighting is preferably selected in such a way that changes in the feed set point value are initially incorporated, namely via weighting with faster dynamics, whereas changes in the actual value of the feed are incorporated later, i.e., via weighting with slower dynamics.

In order to set the second DC voltage, the step-up ratio of the second DC voltage relative to the first DC voltage is preferably set depending on the feed set point value, wherein in particular the step-up ratio is greater than 1 and less than 6, preferably less than 4, in particular less than 2 and/or the step-up ratio is additionally set depending on the first DC voltage. As a result, the step-up ratio can be used to selectively influence the second DC voltage. Alternatively, the second DC voltage is set directly depending on the feed set point value, in particular by means of an active rectifier.

According to one embodiment, it is proposed that the feed set point value is a reactive power set point value. For this purpose, it is thus proposed that the second DC voltage is increased if the reactive power set point value increases. It has been recognized here in particular that a reactive power feed-in can be improved with a higher second DC voltage. It has been recognized that such an improvement in the reactive power feed-in can also be achieved independently of the active power to be fed in. This is in particular based on the knowledge that an increase in the reactive power set point value, which should of course also be accompanied by an increase in the reactive power actually fed in, in particular results in a voltage drop at a power choke. In simple terms, this results in a reduction in the voltage gradient from the generated second AC voltage to the line voltage, i.e., to the voltage in the electrical supply grid. Purely as a precaution, it is pointed out that there can be interposed a transformer which, however, does not change anything in fundamental embodiments, since it can be taken into account in the result with its transmission ratio or the voltage is to be considered corresponding to the transmission ratio.

In any case, such a reduction in the voltage gradient would result in the inverter, which generates the AC voltage signal by way of a corresponding pulse signal, having to initially react to such a reduced voltage gradient by changing the pulse pattern correspondingly. In simple terms, the pulses would have to be wider and the pauses shorter.

In order to avoid this, at least to mitigate it, it is proposed that the second DC voltage is increased. This then means that a correspondingly high desired reactive current can be generated with an unmodified or less modified pulse signal.

Additionally or alternatively, it is proposed that the second DC voltage is set depending on the reactive current component of the electrical power which is fed in. In addition, it is thus also proposed here to not only consider the set point value but to also or only consider the reactive current component which has actually been fed in. This should correspond substantially to its set point value, but it may be possible here to additionally facilitate the reactive current feed-in if the second DC voltage is simply increased in the case of a high reactive current component, where applicable is further increased in addition to the increase depending on the set point value.

In particular, it has been recognized that the inverter can be operated particularly efficiently by selectively setting the second DC voltage. In this case, it has also been recognized that such an efficient operation is not achieved by a particularly high DC voltage or by a particularly low DC voltage but can take place by them being selectively adjusted to the power feed-in. In particular, it has also been recognized that this is also applicable to the reactive power feed-in.

According to one embodiment, it is proposed that a tolerance band method is used for inverting the second DC voltage into the second AC voltage. In a tolerance band method, a tolerance band is specified for each current which is to be fed in. The respective instantaneous value of the current which is fed in is then detected and compared to the two tolerance band limits which define the tolerance band. In this case, if the detected instantaneous value of the current pushes the upper tolerance band limit, a switching process is triggered in the inverter, which performs this inversion, which switching process fundamentally results in a reduction in the output current, i.e., the current which is fed in. If the detected and recirculated instantaneous value of the current which is fed in reaches the lower tolerance band limit, switching is triggered correspondingly which results in an increase in the current which is fed in.

If a high second DC voltage is now present, i.e., a high intermediate circuit voltage, each switching results in a particularly strong current rise or current drop. As a result, the in each case recirculated instantaneous value of the current which is fed in reaches the upper or lower tolerance band limit more quickly. This results in the switching frequency increasing and can also result in switching losses increasing. In light of this knowledge, it is thus proposed to set the second DC voltage, in particular said intermediate circuit voltage, depending on the feed set point value. This means in particular that if the feed set point value is high, a correspondingly high second DC voltage can be used, whereas if the feed set point value is low, a low second DC voltage should also be used. In particular, the tolerance band is of course also adjusted to the feed set point value, so that a high second DC voltage can still be used if the feed set point value is high, without encountering a switching frequency which is too high. In addition, if the feed set point value is high, more voltage can drop at the power choke, which reduces the voltage gradient, as has already been explained previously.

On the other hand, however, the second DC voltage should also not be selected to be too low, so that there still remains a sufficient voltage gradient. Alternatively, the switching frequency can also become too low, in particular when using the tolerance band method, which can in turn result in an excessive distortion of the sinusoidal signal which is to be generated. Finally, the sinusoidal signal which is generated by the inverter is an approximation of a sinusoidal signal, wherein this approximately sinusoidal signal is generated by corresponding switching pulses.

In particular when feeding in reactive power, which in particular applies to using the tolerance band method, but not only for this, it has been recognized that it is also necessary to have a signal which is as sinusoidal as possible for this feed-in of the reactive power. In this case, this can lead to problems, namely flattenings, in particular at the peaks of the sinusoidal signal, i.e., close to the maximum value or minimum value of the desired sinusoidal function. In particular, flattenings of this type can occur if the second DC voltage is too low, i.e., the intermediate circuit voltage is too low, if the current only reaches the corresponding peak value with difficulty owing to the voltage gradient being too low. In particular in tolerance band methods, this means that the current barely reaches the upper tolerance band limit, or, in the negative case, the lower tolerance band limit when close to this peak or this peak value. In extreme cases, if the second DC voltage is too low, then no switching shall occur at all in the area, which can result in a flattening of the current peak there.

Nonetheless, however, in order to prevent the switching losses mentioned from becoming too great, a second DC voltage should also not be selected which is too high.

According to one embodiment, it is proposed that the second DC voltage is set depending on a power, in particular reactive power, which is received from the electrical supply grid. It has been recognized here in particular that not only the positive feed can support the grid but also a power extraction. In particular, extracting reactive power, which is also described as absorption, can counteract a line voltage which is too high at the used grid connection point. A power extraction of this type, in particular reactive power extraction, also requires the control of the inverter which is otherwise used for feed-in. It has been recognized that it is also appropriate here to set the second DC voltage depending on this extraction. In the case of an active power extraction, power could be consumed from the DC voltage intermediate circuit by way of a so-called chopper circuit for this purpose, for example. However, it is preferably proposed that this takes place depending on the reactive power received. For this purpose, the wind power plant can feed in active power and simultaneously receive reactive power.

This simultaneous feed-in of active power and receiving of reactive power is in particular also proposed according to one embodiment. In principle, receiving reactive power, in particular if active power is simultaneously fed in, does not require a chopper circuit or other measures for power consumption. However, it is advantageous to set the second DC voltage in order to therefore extract the reactive power in as efficient a manner as possible and also with as good a sinusoidal signal as possible. In this case, it is proposed that the second DC voltage is increased if the power which is fed in is increased. However, in addition, it is optionally proposed that the second DC voltage is reduced if the received power, in particular the received reactive power, increases, since this means that the power which is fed in is negative and is reducing.

According to one embodiment, it is proposed that the generator has an operating point depending on a prevailing wind and/or depending on a specification and that the second DC voltage is additionally set depending on the operating point. The second DC voltage is therefore set taking into account not only the grid-side feed-in but also generator-side considerations, namely the operating point of the generator. In this way, the generation of the power by the generator can be coordinated to the feed-in in an advantageous manner and a feed-in signal which is as sinusoidal as possible can be generated in as efficient a manner as possible.

Preferably, it is thus also proposed that the second DC voltage is set depending on a power choke, via which the electrical power is fed into the electrical supply grid. The power choke determines the voltage drop by way of its dimensioning, which voltage drop is caused by a current which flows through said power choke. To put it simply, it has thus been recognized that the greater the adjustment of the second DC voltage, the greater the power choke.

In particular, it is thus proposed that the second DC voltage is set depending on the choke value and the line voltage and the reactive power which is fed in or is to be fed in.

According to one embodiment, it is proposed that a step-up converter is used for stepping up the first DC voltage and the second DC voltage, or an active rectifier is used for rectifying the first AC voltage into the second DC voltage without generating the first DC voltage. For this purpose, it is proposed that the step-up converter or the active rectifier is controlled depending on at least one of the following criteria:
  a harmonic content of the current which is fed in;
  an operating point of the feed-in;
  a number of inverters used for inverting;
  an operating point of the generator;
  a reactive power set point value or an actual value of the reactive power;
  a detected line voltage of the electrical supply grid;
  a grid condition of the electrical supply grid;
  a positive sequence component of the current which is fed in;
  a negative sequence component of the current which is fed in;
  the impedance of the power choke;
  an excitation power of the generator if the generator is a separately excited synchronous generator;
  a specification of a grid operator; and
  grid sensitivity of the electrical supply grid.

The harmonic content can also have an influence on the maximum amplitude, in particular of the peak value of what is the substantially, in particular with the exception of the harmonic content, sinusoidal current. A harmonic content can thus indicate a curve which is too flat, and the second DC voltage can be raised to remedy this, so that this flattened area can nevertheless be designed as a non-flattened area again. However, to stay with this example, it is also possible that a flattening of this type is intentional and correspondingly the second DC voltage can then be selected to be lower, since the full peak height does not then need to be generated in the case of this intentional flattening. Correspondingly, the second DC voltage can be set depending on the harmonic content.

The further explanations which are provided for setting the second DC voltage equally or analogously also relate to controlling the step-up converter or the active rectifier.

An operating point of the feed-in, which in particular defines the level of reactive power which is fed in and active power which is fed in, but also additionally the voltage level, has an influence on how well the current which is to be fed in can be generated. For example, in the case of high voltage and simultaneously high currents, which correspondingly define the operating point, a high second DC voltage would have to be selected. This can be taken into account by considering the operating point of the feed-in.

A number of inverters used for inverting has an influence on how much reactive power and thus also how much corresponding reactive current each inverter has to generate respectively. Therefore, and this is advantageously proposed here, each inverter consistently has its own power choke. In this case, how much current in total the generating unit has fed in is thus not relevant, but a distribution to a plurality of inverters is taken into account. It is therefore also possible that not all inverters of the generating unit, such as a wind power plant, for example, feed in reactive current. In this case, the number of inverters which do feed in the reactive current is relevant.

The operating point of the generator is in particular influenced by the step-up converter or the active rectifier. In this case, the step-up converter or active rectifier can in particular influence the level of the output voltage, namely the stator voltage, at the output of the generator. In this respect, this would be a quantitative influence on this voltage. However, a qualitative influence on this voltage is also possible. In particular, the active rectifier can influence the quality, i.e., in particular also signal form, in a very selective manner. However, an influence of this type also results from a step-up converter, the influence of which on the first DC voltage can have an effect on the voltage at the output of the synchronous generator via the rectifier. It is therefore advantageous to consider the operating point of the generator. The operating point of the generator can here in particular also relate to its speed and the present power output. In addition, it can also relate to the excitation of the rotor, if it is a separately excited synchronous generator, which is preferably proposed here.

A reactive power set point value or an actual value of the reactive power can also directly influence a voltage drop at a power choke and thus a voltage gradient. It is therefore also advantageous to consider a reactive power value for setting the second DC voltage. Considering a reactive power set point value is particularly advantageous if it is easier to detect than the actual value of the reactive power. In this case, it can be regularly assumed that an actual value of the reactive power is also set corresponding to the reactive power set point value. In this case, it is beneficial to consider at least one of these two values, i.e., the reactive power set point value or actual value of the reactive power, for setting the second DC voltage, which has been recognized here.

A detected line voltage of the electrical supply grid, which is namely fed into, can also influence the voltage gradient and is therefore advantageously to be taken into account when setting the second DC voltage.

A grid condition of the electrical supply grid, i.e., a condition which goes beyond the question of the detected line voltage, can also have an influence on the feed-in, in particular of the reactive current, but also on the feed-in of an active current.

Grid conditions of this type in particular include any grid faults. If a grid fault is present or if an instability is present, or if a grid fault or an instability was recently present, or if something of the like is anticipated, a rather higher second DC voltage is preferably proposed in order to thus enable the inverter to be able to operate in a better and more flexible manner. In such cases, it is initially less important whether by selecting a high second DC voltage a switching frequency which is too high is possibly encountered with increased losses, since it is initially more important to guarantee grid stability in such a situation. Of course, the second DC voltage should not be selected to be so high that operation of the inverter is compromised, for example by overheating. However, a slight reduction in the running time owing to a temporarily high temperature may possibly be acceptable.

In particular, it has also been recognized here that it is possible to encounter an overvoltage in the grid when a grid fault returns, in particular a voltage dip. In order to be able to feed in well despite an overvoltage or high voltage of this type in the electrical supply grid, a high second DC voltage can be provided in such a case which should already be set before the overvoltage or high voltage is encountered in the grid.

Preferably, it is proposed that the current which is fed in is divided into a positive sequence component and a negative sequence component according to the symmetrical component method. Such a consideration is preferably at least taken as the basis. It has then been recognized that it can be advantageous to only take into account the positive sequence component of the current which is fed in as information regarding the current which is fed in for setting the second DC voltage. The voltage level of the second DC voltage is thus set well and the positive sequence component of the current which is fed in can therefore ultimately also be generated well.

However, according to one embodiment, it has been recognized that considering the negative sequence component of the current which is fed in can provide information about the current which is fed in and namely in a manner which is also relevant for the second DC voltage.

The negative sequence component provides information about the imbalance of the three-phase current which is fed in. This can result in the voltages of the phases also being different, which can result in different voltage gradients of the phases. The level of the second DC voltage affects all phases. If the phases, in particular of a considered emitted current, namely of the actual current which is fed in, are different, there is the risk that the second DC voltage is ill-suited for one of the phases. In order to counter this, it is proposed that the negative sequence component is taken into account.

Preferably, it is proposed that the second DC voltage is set according to the highest voltage of the three phases.

However, it is also possible that the second DC voltage fluctuates in phases and correspondingly the second DC voltage can oscillate to a small extent. Such an oscillation of the second DC voltage, particularly depending on the negative sequence component of the current which is fed in, is also preferably proposed. According to one embodiment, the second DC voltage is thus controlled in such a way that it fluctuates or oscillates.

An excitation power of the generator can have an influence on operation performance and thus also on the output voltage, and there can also be an interaction between the voltage at the output of the generator and the excitation power. In this respect, it can be beneficial to take into account the operating point of the generator, as has already been explained. If the generator is a separately excited synchronous generator, the excitation power of the generator is preferably also considered individually. An improved coordination with the generator can then be carried out.

It has also been recognized that feeding electrical current into the electrical supply grid can depend on a specification of the grid operator. A specification of this type can in particular relate to a desired reactive power which is to be fed in, but it can also relate to a desired active power. Instead of absolute values, relative values can also be specified. In particular, relative values can be specified for reducing or increasing the active power and/or reactive power. In order to be able to implement these specifications particularly well, it is proposed that the second DC voltage is adjusted correspondingly, i.e., increased or reduced, or left the same.

For a grid connection point, grid sensitivity describes the ratio of a voltage change to a change in the power which is fed in at the grid connection point which has caused this voltage change. In particular, the grid sensitivity here describes the ratio of the voltage change to the change in the active power which is fed in, which has caused this line voltage change, at this grid connection point. Based on this grid connection point, the electrical supply grid can thus be evaluated as to whether it is currently more or less stable, i.e., whether it reacts strongly or weakly to changes. In particular in the case of high grid sensitivity, i.e., if the electrical supply grid at this grid connection point reacts strongly to changes, it is proposed that the second DC voltage is set to be higher than in the case of low grid sensitivity. As a result, it is possible to react to changes in a better, quicker or more sustainable manner in particular even in the case of high grid sensitivity. For example, a necessary demand for reactive power for grid support can be met more quickly.

According to one embodiment, it is proposed that when the first DC voltage is present, i.e., if a first DC voltage is used together with a step-up converter, this first DC voltage is ascertained by directly measuring the first DC voltage and by detecting the power generated by the generator. For this purpose, it is additionally or alternatively proposed that the first DC voltage is higher than 100 V and lower than 800 V, in particular lower than 400 V. As a result, it is in particular achievable that this first DC voltage is particularly suitable for operating the generator, but at the same time also provides a good basis for setting the second DC voltage. The first DC voltage can be detected well by immediate measurement or direct measurement, alternatively it can be ascertained by detecting the power generated by the generator, which can save a measuring device (i.e., voltmeter) on the first DC voltage if, which is preferably proposed, a control system is used which already knows the power generated by the generator.

According to one further embodiment, it is proposed that the step-up ratio is set in such a way or rectifying the first AC voltage into the second DC voltage is controlled in such a way that the second DC voltage is higher than 400 V, in particular higher than 600 V, and that it is lower than 1000 V, i.e., in both cases. A range of 400 to 1200 V is thus selected, preferably from 600 to 1000 V, in which it is still possible to feed into the electrical supply grid well, but at the same time it is also possible to set the second DC voltage, where applicable, efficiently low.

According to the invention, a wind power plant is additionally proposed which implements at least one method of the embodiments described above.

According to the disclosure, in particular, a wind power plant is proposed for feeding electrical power into an electrical supply grid, which wind power plant has a generator for generating electrical power and for emitting a first AC voltage. It also has at least one rectifying device for rectifying the first AC voltage into a first DC voltage and at least one step-up device for stepping up the first DC voltage to a second DC voltage, in particular in such a way that the second DC voltage has a step-up ratio relative to the first DC voltage.

In particular, the first rectifying device can be formed as a passive rectifier or a different rectifier. In particular, the step-up device is formed as a step-up converter.

Instead of the first rectifying device and the step-up device, the wind power plant can alternatively have an active rectifier for rectifying the first AC voltage into the second DC voltage without generating the first DC voltage.

At least one inverter is in turn provided for both alternatives, for inverting the second DC voltage into a second AC voltage for feeding electrical power into the electrical supply grid depending on a feed set point value. Finally, a setting device is provided which is prepared for setting the second DC voltage depending on the feed set point value or actual value of the feed. The setting device is configured in such a way that the second DC voltage is increased depending on an increase in the feed set point value or actual value of the feed. The setting device is preferably provided as a control setting device (i.e., controller) which can be formed as a process computer or a part thereof. It can therefore control the active rectifier or the step-up device and additionally or alternatively the at least one inverter, in order to thus set the second DC voltage. In particular, the second DC voltage depends on the power generated by the generator and the power fed into the grid, in particular reactive power and/or active power. In particular, this interaction can be taken into account by the setting device or when implementing the active rectifier or the step-up device and the at least one inverter.

Preferably, a power choke is connected downstream of each of the inverters and the current which is generated in each case by the inverter is guided through this power choke. In the simplest case, this means that only one inverter is provided with a power choke. However, a plurality of inverters is preferably used.

According to the disclosure, a wind park with a plurality of wind power plants is also proposed according to at least one embodiment described above. In particular, each wind power plant here can set the second DC voltage per se as described according to at least one embodiment. However, it is also or additionally possible that the wind park has a central park computer, and this transmits information to the wind power plants which is used to set the second DC voltage. In this case, it is in particular possible that the central park computer, or a different central device, receives information from a grid operator and transmits this information or information derived therefrom to the wind power plants. The wind power plants can then be controlled depending on this information, in particular the second DC voltage can be set depending on this information.

BRIEF DESCRIPTION OF THE SEVERAL VIEWS OF THE DRAWINGS

The invention is explained in greater detail hereinafter by way of example using embodiments with reference to the accompanying figures.

DETAILED DESCRIPTION

Figure 1:
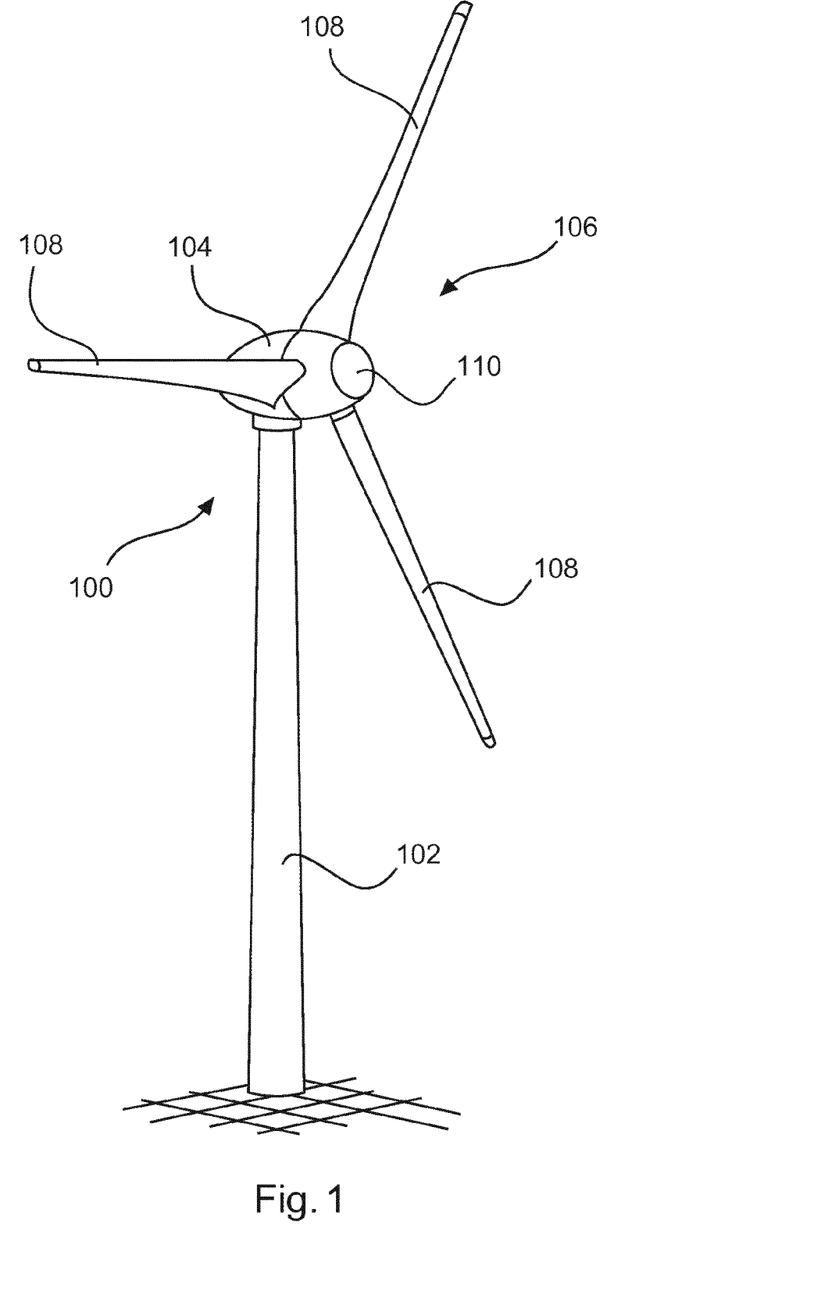
FIG. 1 shows a perspective representation of a wind power plant.

FIG. 1 shows a wind power plant 100 with a tower 102 and a nacelle 104. A rotor 106 with three rotor blades 108 and a spinner 110 is arranged on the nacelle 104. During operation, the rotor 106 is transferred into a rotational movement by the wind and thus drives a generator in the nacelle 104.

Figure 2:
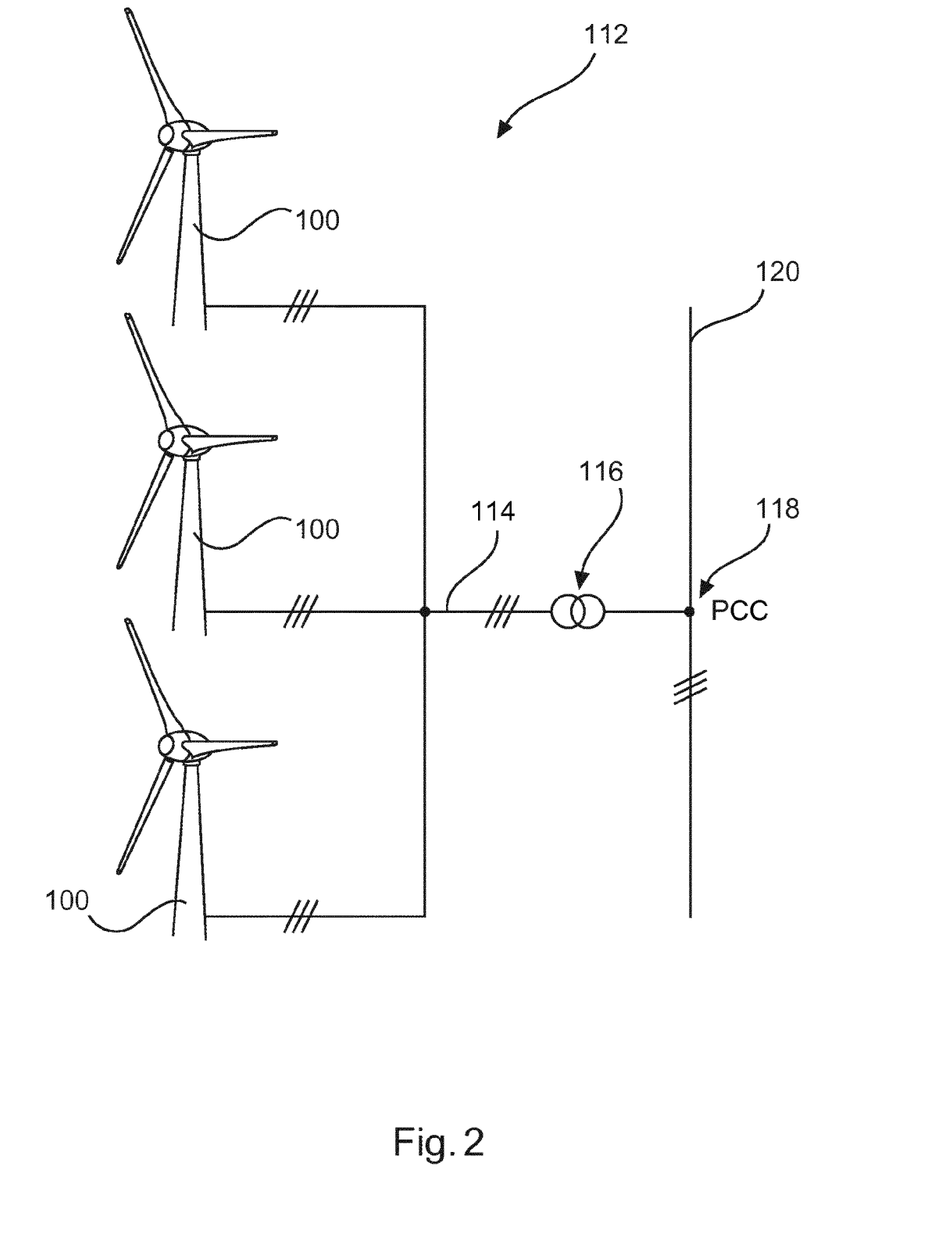
FIG. 2 shows a schematic representation of a wind park.

FIG. 2 shows a wind park 112 with three wind power plants 100 by way of example, which can be identical or different. The three wind power plants 100 thus represent essentially any number of wind power plants of a wind park 112. The wind power plants 100 provide their power, namely the generated current in particular, via an electrical park grid 114. In this case, the respectively generated currents or power from the individual wind power plants 100 are added up and a transformer 116 is usually provided which boosts the voltage in the park in order to then feed into the supply grid 120 at the feed-in point 118, which is also generally described as PCC. FIG. 2 is merely a simplified representation of a wind park 112, which does not show a control system, for example, although a control system is present, of course. The park grid 114 can also be configured in a different manner, for example, to name just one other example, wherein a transformer is also present at the output of each wind power plant 100, for example.

Figure 3:
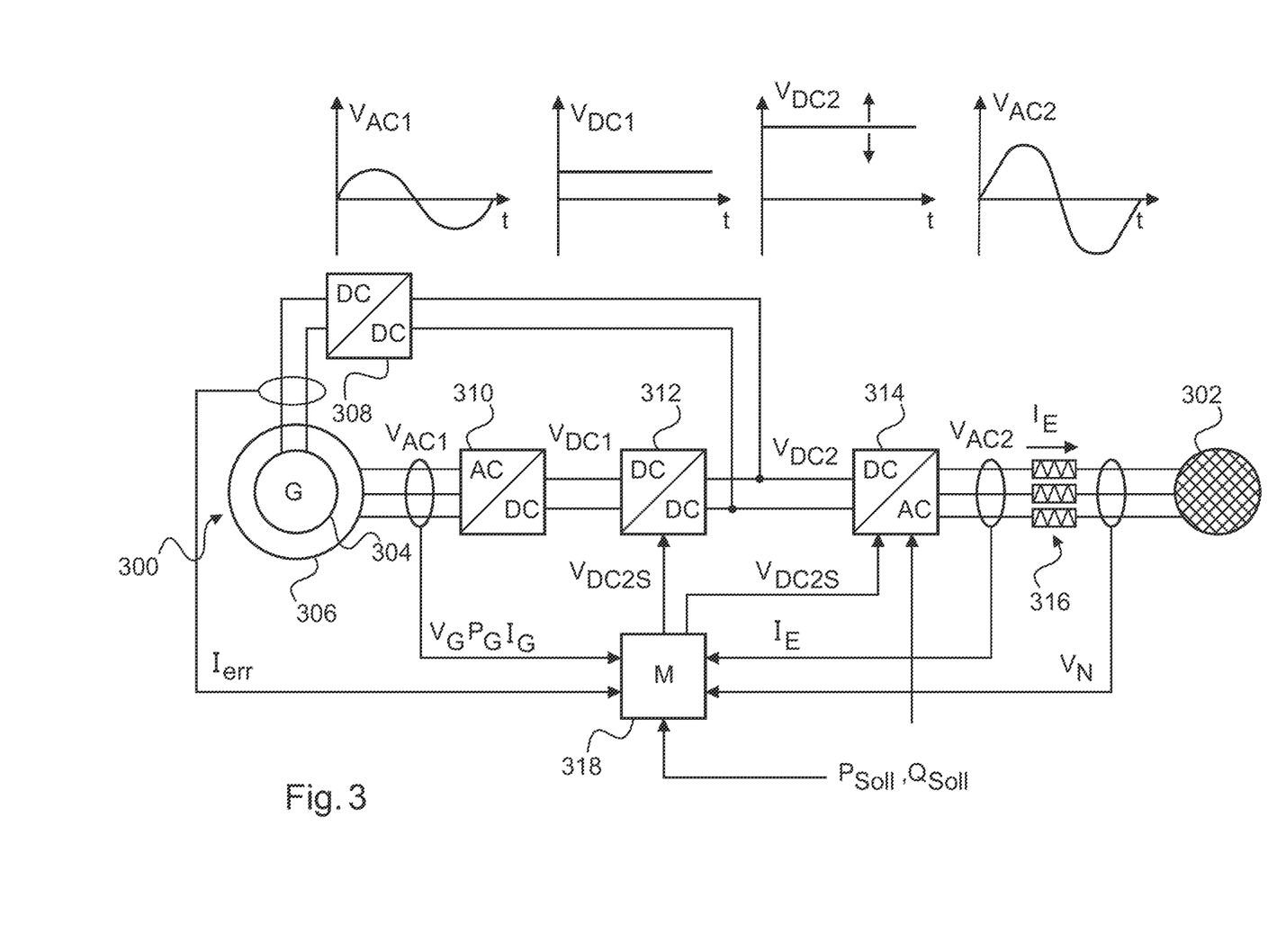
FIG. 3 schematically shows a generator of a wind power plant and its connection to an electrical supply grid according to an embodiment.

FIG. 3 schematically shows a generator 300, which feeds into or is intended to feed into an electrical supply grid 302. The generator 300 is formed as a separately excited synchronous generator and has an armature 304 and a stator 306. The armature 304, which can also be described as a rotor but here is described as an armature, in order to avoid any confusion with an aerodynamic rotor of the wind power plant, rotates relative to the stator 306.

The generator 300 shown is a separately excited synchronous machine here and in addition the armature 304 receives an exciting current $I_{exc}$ from an excitation converter 308.

The generator 300 emits a stator voltage from the stator 306, which stator voltage forms the first AC voltage $V_{AC1}$ here. This first AC voltage $V_{AC1}$ is represented in three phases here. Preferably, provision can also be made for two three-phase AC voltages to be emitted which correspondingly form a six-phase AC voltage, which applies to all embodiments.

This first AC voltage $V_{AC1}$ is then rectified into the first DC voltage $V_{DC1}$ by means of a first rectifying device which is formed as a passive rectifier 310 here.

The first DC voltage $V_{DC1}$ is stepped up to the second DC voltage $V_{DC2}$ by means of the step-up converter 312. This second DC voltage $V_{DC2}$ can also serve as a source for the excitation converter 308 which, however, is only one of a plurality of possibilities for supplying the excitation converter 308.

The second DC voltage $V_{DC2}$ is then converted into the second AC voltage $V_{AC2}$ by means of the inverter 314. For this purpose, a tolerance band method is preferably proposed here which recirculates the resulting current and attempts to maintain it within a tolerance band by way of corresponding switching operations. However, details regarding this are not reproduced here. Depending on this second AC voltage $V_{AC2}$, a current then arises which flows through the power choke 316 and then continues to flow into the electrical supply grid 302, i.e., is fed in there. In principle, the feed-in can take place via a transformer which can provide a boost to the second AC voltage $V_{AC2}$ or the AC voltage at the output of the power choke, depending on the voltage level in the electrical supply grid 302. However, in this case, this boost is not important, such that a transformer of this type has been omitted for the sake of simplicity.

It is now proposed that the second DC voltage $V_{DC2}$ is increased or reduced as required. This can take place by way of the step-up converter 312 and/or the inverter 314. For this purpose, a measuring and control block 318 is provided which generates a corresponding set point value $V_{DC2S}$ and correspondingly provides it to the step-up converter 312 or the inverter 314. FIG. 3 shows both specifications, i.e., to the step-up converter 312 and to the inverter 314, however provision can alternatively be made for only one of the two possibilities to be used.

For this purpose, the measuring and control block 318 receives at least one feed set point value which is illustrated here as $P_{sp}$ and $Q_{sp}$. Preferably, the set point of the active power and/or set point of the reactive power is actually used, however other variables, and in particular also additional variables, are also possible.

Using $P_{sp}$ and/or $Q_{sp}$ is thus using the corresponding feed set point value. In this respect, $P_{sp}$ or $Q_{sp}$ describes the active power which is to be fed in or reactive power which is to be fed in, and these are thus each feed set point values. These feed set point values are also specified to the inverter 314, since said inverter is intended to control the corresponding feed-in. It should be considered that FIG. 3 is illustrative in this respect and it is also possible that the inverter 314 inherently specifies its set point values to the measuring and control block 318, for example. It is also possible that the functionality of the symbolically represented measuring and control block 318 is accommodated in a common process computer which controls at least the inverter 314 and/or the step-up converter 312.

For implementation, the step-up converter 312 can then implement a step-up ratio of the first DC voltage relative to the second DC voltage $V_{DC1}$, $V_{DC2}$, in particular by way of a duty cycle. The inverter 314, for which the second DC voltage $V_{DC2}$ can also form its intermediate circuit voltage, can implement control of this second DC voltage $V_{DC2}$ by feeding in more or less power. However, in this case, minor changes can be sufficient so that the specification of the set point values $P_{sp}$ and $Q_{sp}$ can still be substantially maintained. However, it is also possible to control the second DC voltage via the specification of $P_{sp}$, at least partially.

Setting the second DC voltage $V_{DC2}$ can also take further input variables into account, which is illustrated here as the consideration of further input variables by the measuring and control block 318, wherein, however, it is actually also a variant that a measuring and control block 318 of this type is provided as an independent element.

In this respect, FIG. 3 nevertheless illustrates that an excitation power or an exciting current $I_{exc}$ is taken into account. Such a current which is generated by the excitation converter 308 can be detected for this purpose, which is symbolized by FIG. 3. However, the excitation converter 308 can alternatively also emit corresponding information.

Output values of the generator 300 can also be used, and in this case its operating point can also be used and in order to demonstrate this, values are recorded between the generator 300 and the passive rectifier 310 which are illustrated in a simplified manner as generator voltage $V_G$, generator power $P_G$ and generator current $I_G$.

It is also possible to take into account the current which is fed in $I_E$ and it is also possible to take into account the line voltage $V_N$. In principle, all of these considerations can also be combined. Better and more differentiated bases for setting the second DC voltage $V_{DC2}$ are the result of combinations.

A time progression for the first AC voltage $V_{AC1}$, the first DC voltage $V_{DC1}$, the second DC voltage $V_{DC2}$ and the second AC voltage $V_{AC2}$ is additionally represented in FIG. 3 by four schematic diagrams, namely in each case above the area of the structure shown in which they are encountered. It can be recognized therefrom, which is an idealized representation, that the first AC voltage $V_{AC1}$ is rectified into the first DC voltage $V_{DC1}$ and it is then increased to the voltage level of the second DC voltage $V_{DC2}$. In the diagram of the second DC voltage $V_{DC2}$, two arrows indicate that the voltage level can be increased or reduced. The second DC voltage $V_{DC2}$ is then inverted into the second AC voltage $V_{AC2}$.

Figure 4:
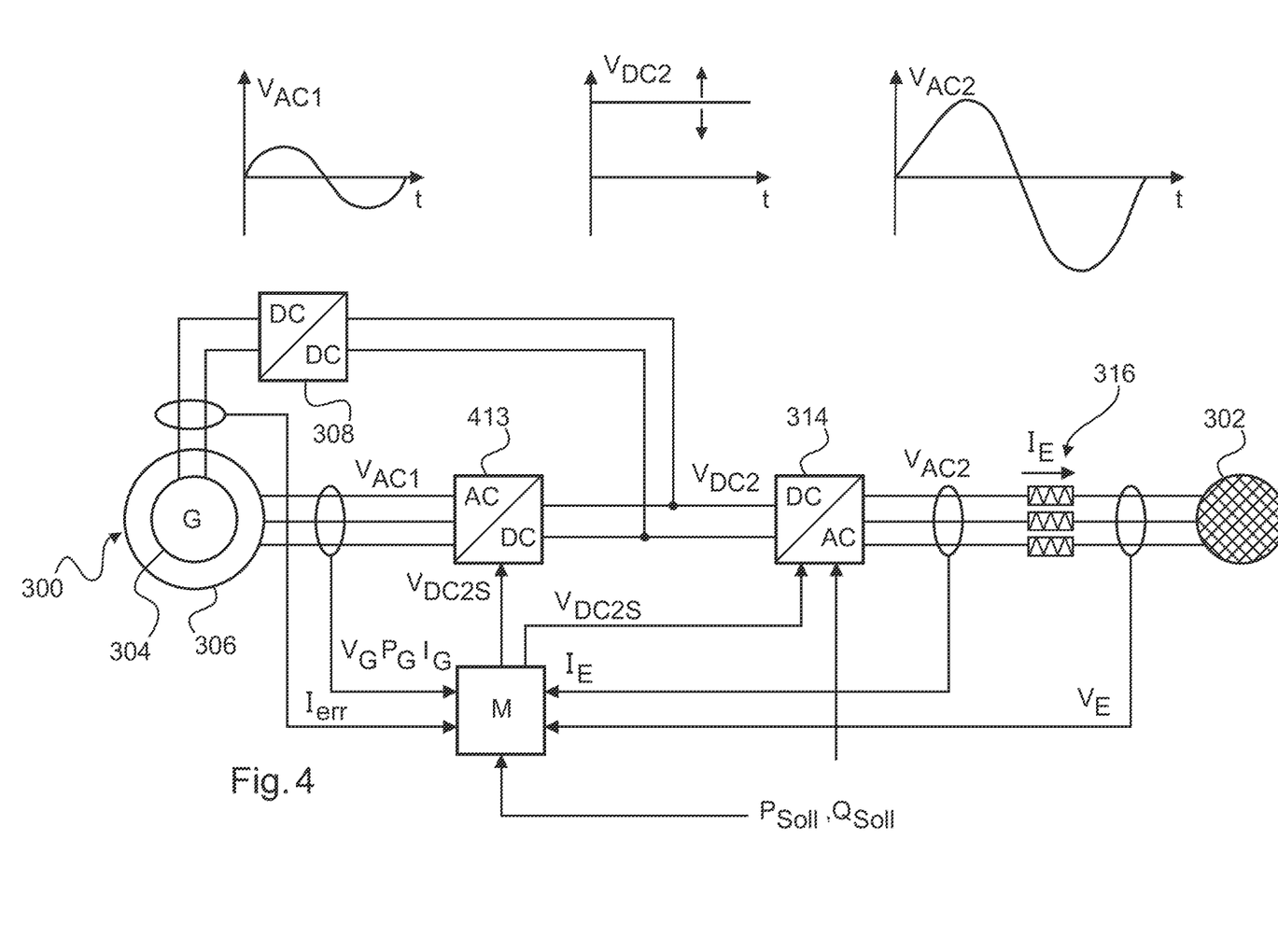
FIG. 4 shows a generator of a wind power plant and its connection to an electrical supply grid according to a further embodiment.

FIG. 4 corresponds substantially to FIG. 3, with the difference being that an active rectifier 413 is provided instead of the passive rectifier 310 and the step-up converter 312. This active rectifier 413 rectifies the first AC voltage $V_{AC1}$ directly into the second DC voltage $V_{DC2}$.

Although this can also have different effects on the first AC voltage $V_{AC1}$, which in turn can also have an influence on the operation of the generator 300, identical or at least similar elements are still described in a simplified manner in FIG. 4 with the same reference numbers in comparison to the structure of FIG. 3. These can actually be identical, are at least similar in their mode of operation. In this respect, for explanation, reference is also made to the explanation for FIG. 3.

In this case, the structure of FIG. 4 is such that the second DC voltage $V_{DC2}$ can be set by the active rectifier 413 and/or by the inverter 314. A combination is also possible in this case.

In order for the active rectifier 413 to set the second DC voltage $V_{DC2}$, this active rectifier 413 can correspondingly control its rectifying device. Controllable rectifying devices of this type can be controllable thyristors or IGBTs, for example.

In comparison to FIG. 3, only three voltage diagrams are thus represented in FIG. 4, which voltage diagrams schematically show the respective voltage and in the representation in FIG. 4 are also each drawn above the respective point of the structure where the corresponding voltage is encountered.

Correspondingly, the three diagrams initially show the first AC voltage $V_{AC1}$ which is rectified into the second DC voltage $V_{DC2}$ by means of the active rectifier and from which the second AC voltage $V_{AC2}$ is then generated by inversion. The diagram also indicates here that the level of the second DC voltage $V_{DC2}$ can be changed.

The invention claimed is:

1. A method, comprising:
generating a first DC voltage from a first AC voltage of generated electrical power generated by a generator, wherein generating the first DC voltage comprises:
passive rectifying the first AC voltage into a second DC voltage and stepping up the second DC voltage to the first DC voltage so that the first DC voltage has a step-up ratio relative to the second DC voltage,
inverting the first DC voltage into a second AC voltage for feeding the electrical power into an electrical supply grid depending on a feed set point value;
wherein the first DC voltage depends on the feed set point value and on a current passing through a power choke, wherein the first DC voltage is increased when the feed set point value increases; and
feeding the electrical power into the electrical supply grid via the power choke.

2. The method as claimed in claim 1, wherein:
the setting the step-up ratio of the first DC voltage to the second DC voltage depends on the feed set point value; or
the passively rectifying the first AC voltage into the first DC voltage depends on the feed set point value.

3. The method as claimed in claim 2, wherein the generating the first DC voltage comprises the passive rectifying, and wherein the step-up ratio is greater than 1 and less than 6.

4. The method as claimed in claim 2, wherein the step-up ratio is less than 4.

5. The method as claimed in claim 2, wherein the step-up ratio is set depending on the second DC voltage.

6. The method as claimed in claim 1, wherein the inverting the first DC voltage into the second AC voltage comprises using a tolerance band method.

7. The method as claimed in claim 1, wherein the first DC voltage depends on power received from the electrical supply grid.

8. The method as claimed in claim 7, wherein the power received from the electrical supply grid is reactive power.

9. The method as claimed in claim 1, wherein:
the generator has an operating point depending on a prevailing wind or depending on a specification, and
the first DC voltage additionally depends on the operating point.

10. The method as claimed in claim 1, wherein:
a step-up converter is used for the stepping up the second DC voltage to the first DC voltage, and
the step-up converter is controlled depending on at least one criterion from a list including:
a harmonic content of a fed-in current;
an operating point of a feed-in;
a number of inverters used for inverting;
an operating point of the generator;
a reactive power set point value or an actual value of the reactive power;
a detected line voltage of the electrical supply grid;
a grid condition of the electrical supply grid;
a positive sequence component of the fed-in current;
a negative sequence component of the fed-in current;
an impedance of a power choke;
an excitation power of the generator when the generator is a separately excited synchronous generator;
a specification of a grid operator; and
grid sensitivity of the electrical supply grid.

11. The method as claimed in claim 1, comprising:
determining the second DC voltage by directly measuring the second DC voltage or by detecting the generated electrical power generated by the generator,
wherein the second DC voltage is higher than 100 V and lower than 800 V.

12. The method as claimed in claim 11, wherein the second DC voltage is lower than 400 V.

13. A method, comprising:
generating a first DC voltage from a first AC voltage of generated electrical power generated by a generator, wherein generating the first DC voltage comprises:
rectifying the first AC voltage into a second DC voltage and stepping up the second DC voltage to the first DC voltage so that the first DC voltage has a step-up ratio relative to the second DC voltage;

inverting the first DC voltage into a second AC voltage for feeding the electrical power into an electrical supply grid depending on a feed set point value;

wherein the first DC voltage depends on the feed set point value, wherein the first DC voltage is increased when the feed set point value increases;

wherein:
the step-up ratio sets the first DC voltage to be between 400 V and 1200 V; or
the rectifying the first AC voltage into the first DC voltage sets the first DC voltage to be between 400 V and 1200 V, wherein:
the feed set point value is a reactive power set point value; or
the first DC voltage is set depending on a reactive current component of the electrical power fed into the electrical supply grid.

14. A wind power plant for feeding electrical power into an electrical supply grid, comprising:

a generator configured to generate electrical power and for outputting a first AC voltage;

a first rectifier configured to rectify the first AC voltage into a first DC voltage, and at least one step-up converter configured to step up the first DC voltage to a second DC voltage with a step-up ratio of the second DC voltage relative to the first DC voltage;

a controller configured to set the second DC voltage depending on a feed set point value, wherein the feed set point value depends on an electrical characteristic of the supply grid, wherein the second DC voltage is increased depending on an increase in the feed set point value;

at least one inverter configured to invert the second DC voltage into a second AC voltage for feeding the electrical power into the electrical supply grid depending on the feed set point value; and a power choke connected downstream of the at least one inverter.

15. A wind park with a plurality of wind power plants including the wind power plant as claimed in claim 14.

* * * * *